April 9, 1957 M. E. EVANS 2,788,388

APPARATUS AND METHOD FOR PHOTOGRAPHY OF TELEVISION

Filed Sept. 13, 1950 11 Sheets-Sheet 1

INVENTOR.

Martin E. Evans

BY

INVENTOR.
Martin E. Evans

INVENTOR.
Martin E. Evans

APPARATUS AND METHOD FOR PHOTOGRAPHY OF TELEVISION

Filed Sept. 13, 1950

11 Sheets-Sheet 4

INVENTOR.

Martin E. Evans

INVENTOR.
Martin E. Evans

April 9, 1957 M. E. EVANS 2,788,388

APPARATUS AND METHOD FOR PHOTOGRAPHY OF TELEVISION

Filed Sept. 13, 1950 11 Sheets-Sheet 6

INVENTOR.

Martin E. Evans

Martin E. Evans

APPARATUS AND METHOD FOR PHOTOGRAPHY OF TELEVISION

Filed Sept. 13, 1950

11 Sheets-Sheet 8

INVENTOR.

Martin E. Evans

INVENTOR.
Martin E. Evans

April 9, 1957 M. E. EVANS 2,788,388

APPARATUS AND METHOD FOR PHOTOGRAPHY OF TELEVISION

Filed Sept. 13, 1950 11 Sheets-Sheet 10

INVENTOR.

Martin E. Evans

BY

INVENTOR.
Martin E. Evans

United States Patent Office 2,788,388

Patented Apr. 9, 1957

2,788,388

APPARATUS AND METHOD FOR PHOTOGRAPHY OF TELEVISION

Martin E. Evans, Brooklyn, N. Y.

Application September 13, 1950, Serial No. 188,903

12 Claims. (Cl. 178—5.8)

This invention relates to photography and more particularly to means for recording for reproduction in color television pictures occurring at one frame frequency on motion picture film which is moving at another frequency chosen from an available operative range of frequencies.

Color television involves three separate images in the primary colors having the color value by image area, or line by line, or dot by dot, and various other arrangements. Which ever analytical arrangement is employed, it must be duplicated in the film and means must be provided to identify the arrangement so that suitable color screens may be applied for projection from black and white film.

In the usual motion picture camera there is provided an objective, a gate for positioning the film, a shutter operative between the gate and the objective, an intermittent mechanism to pull the successive increments of film past the gate, and a sprocket to propel the film, all cooperatively operated. Taking the operating range as between 24 frames per second for theater motion picture practice and 6 frames per second for the minimum to reproduce motion, the problem of recording the intermittent images of a television screen occurring at different rates involves several factors. The fixed relationship existing between shutter and gate, shutter and pull down, pull down and drive, and shutter and drive must be released so that their cooperative time of action may be adjusted to meet requirements in the foregoing frame range .

By reason of the cyclic angular relation existing between the shutter and the pulldown mechanism, the durations of their operating intervals change with the frame rate. The change from 24 frame rate to 6 frame rate changes the exposure and pull down intervals so that the pull down interval must be established on the basis of the television picture rate.

Currently for the elimination of flicker, television receiving screens are operated with intermittent light provided by cathode ray tubes whose rays provide 60 images per second interlaced to provide 30 frames per second from 60 fields. The time base currently is 525 lines divided into 262½ odd and 262½ even lines interlaced to form a frame. The lines traced horizontally on the screen are missing from the screen in the amount of 13 to 20 per field or 26 to 40 per frame due to the vertical retrace blanking operation to get the ray from the bottom to the top of an image. Hence it is that a blanking period of substantial amount occurs on the television screen which establishes the intermittent lighting incident to the image production and the intermittent lighting utilized to photograph successive images. This blanking period amounts to 8 percent of the image or frame time in the regular production of an image occurring 30 times per second. To photograph these images at 6 per second involves blanking of 4 out of 5 and taking one not occurring during pull down time. To photograph at 24 per second involves blanking out those parts of images occurring at pull down time and recording the following integral and fractional fields required for a frame of 1/30 second.

The recording of an image requires an exposure interval long enough to permit the cathode ray to trace a complete picture which is 1/60 second for field and 1/30 second for a frame, the latter being the preferred unit for recording.

Expressing the operating period in angular terms, with 360° as a cyclic period for the shutter and pull down, the 360° represents 1/24 second and 1/6 second time intervals at 24 and 6 frames respectively per second. At 24 frames, 24×360 degrees are covered per second and an exposure of 1/30 second at this rate becomes $$\frac{24\times 360}{30}=288^\circ$$

The shutter of 72 degrees must blank the film during the pull down. It has an initial interval of partial cut off, a succeeding interval of full cut off, and a final interval of partial cut off. Commercial pull down of the type shown by U. S. Patent 2,144,277, J. M. Wall, as modified by this invention, provides a pull down in 40° interval, establishing the full cut off interval, from which 16° for the cut off and opening respectively is derived.

At 6 frames, 6×360 degrees are covered per second and an exposure of 1/30 second at this rate becomes $$\frac{6\times 360}{30}=72^\circ$$

During the 1/6 second or 360° interval, five television pictures occur. One of these must be blanked out during the 72° interval of the shutter provided for the higher film rate. Some means must be provided to blank out 3 of the 4 and to select one of the 4 for recording, and preferably to variably select the one in successive series of five. This is provided for by means of supplementary control of the cathode ray with means to vary its time of operation. In the photography of television pictures provided by the practice of projection lighting taught in U. S. Patent 2,330,171, this supplementary control becomes a primary control in which both the projection light and the cathode ray are utilized.

In U. S. Patent 2,330,171, the ray in the cathode tube traces on a transparent crystal screen an invisible image which becomes visible only by action of projected light from an outside source through the crystal to an outside viewing screen. The viewing screen is completely remote from the cathode ray tube and the images thereon are of a character similar to standard motion pictures in that the crystal takes the place of the usual film and obstructs the passage of projected light in varying degree over the crystal area to provide the image. The period of obstruction by the crystal is limited. The effect of the ray fades out and is replaced by other rays, giving the effect of varied lighting on the viewing screen.

The foregoing is by way of outlining the problems to be met by this invention in the field of recording color television by photography, where the television pictures occur at a rate $b$ and the photography is at a lesser rate $a$, and an exposure of $1/b$ seconds is practiced and no exposure for $1/a-1/b$ less the partial cut off period.

In practicing my invention, process and apparatus are provided to correlate the occurrence rates of the television fields and frames with lesser occurrence rates of photographic frames on film and to modify the showing intervals of the television images of both fields and frames to such an extent as is required to record them at the lesser rate. The process and apparatus correlate and modify in one instance with respect to black and white images and their recordings and in another instance with respect to color images and their recordings. In both instances provision is made for recording by a general purpose camera with a rotating shutter and rotating timing means mounted with the camera and having an operating connection to the camera and to the television image tube.

The former connection synchronizes the camera and timing operations, the latter connection suitably modifies the television image occurrence for recording. In one manner of operation the adjustable shutter is rotated continuously and while rotating continuously the rotating shutter is arranged to be adjusted in either of two ways to pass light continuously from the tube image to the film while the before mentioned rotating timing means is arranged and operated to modify the occurrence of the television image suitably to permit movement of film at a preselected rate. Provision is made for shutting extraneous light from the film when the shutter is operated openly by a temporary dark chamber wherein the television screen and the camera objective are opposed closures, and wherein hinged closures permit inspection of the television screen and evaluation of the actinic quality of the television image simultaneously. Provision is made for selectively scanning the televised images for color values by color screens operated (1) in three primary color sequence, (2) in three color strip step and return sequence and (3) in strip forward step, side step and return sequence.

It is an object of this invention to remove the limitations imposed upon motion picture photography by the limitations of the individual elements in a motion picture machine, by the assembled arrangement of those elements, and by the carrier of the photographic emulsion utilizing those elements.

Among the further objects of this invention are physical assembly of motion picture machine elements for accessibility particularly of the shutter; an increase in range of shutter action; provision for phasing of the shutter; provision for color filters to successively analyze light into its primary colors; provision for identifying the analyzed colors on exposed and developed emulsion; provision for recording on the emulsion carrier sound at the scene photographed, with monitoring sound play back; provision for transporting the film in the camera and automatic threading of the camera; provision for overrunning operation of the pull-down mechanism; provision for conversion for high speed photography and for projection; provision for electronic light control and phasing relative to the film; and provision of a carrier for the photographic emulsion that is cheap, subject to repeated use, and adapted to be emulsion coated by the photographer.

It is a further object of this invention to provide photographic apparatus basically adapted to use in diverse fields.

Motion picture machines are operated in diverse fields and with varied lighting conditions, such as motion picture studios, news reel recording, scientific investigation, stroboscopic engineering investigation, television screen photography, and color photography. The usual motion picture machine and machines designed for special fields such as television screen photography have not been readily usable in other fields heretofore. They have lacked (1) flexibility in manipulation of the shutter; (2) flexibility in moving the film in the machine; (3) flexibility in phasing the electric drive with film pull-down; (4) flexibility in primary color recording; (5) flexibility in identifying the color with its film frame; (6) flexibility in sound recording and reproduction; (7) flexibility in film projection; (8) flexibility in the type of emulsion carrier; and (9) flexibility in exposure light control. To provide any one of these is an addition to the art. To provide them collectively, making them available simultaneously in a single machine is a further addition to the art, providing new, basic and pioneer photographic apparatus. The methods of photography using this apparatus are new and basic.

Further objects of the invention and novel features will be apparent from the following specification when considered together with the accompanying drawing in which.

Figures 23, 24, 25, 26, 27:
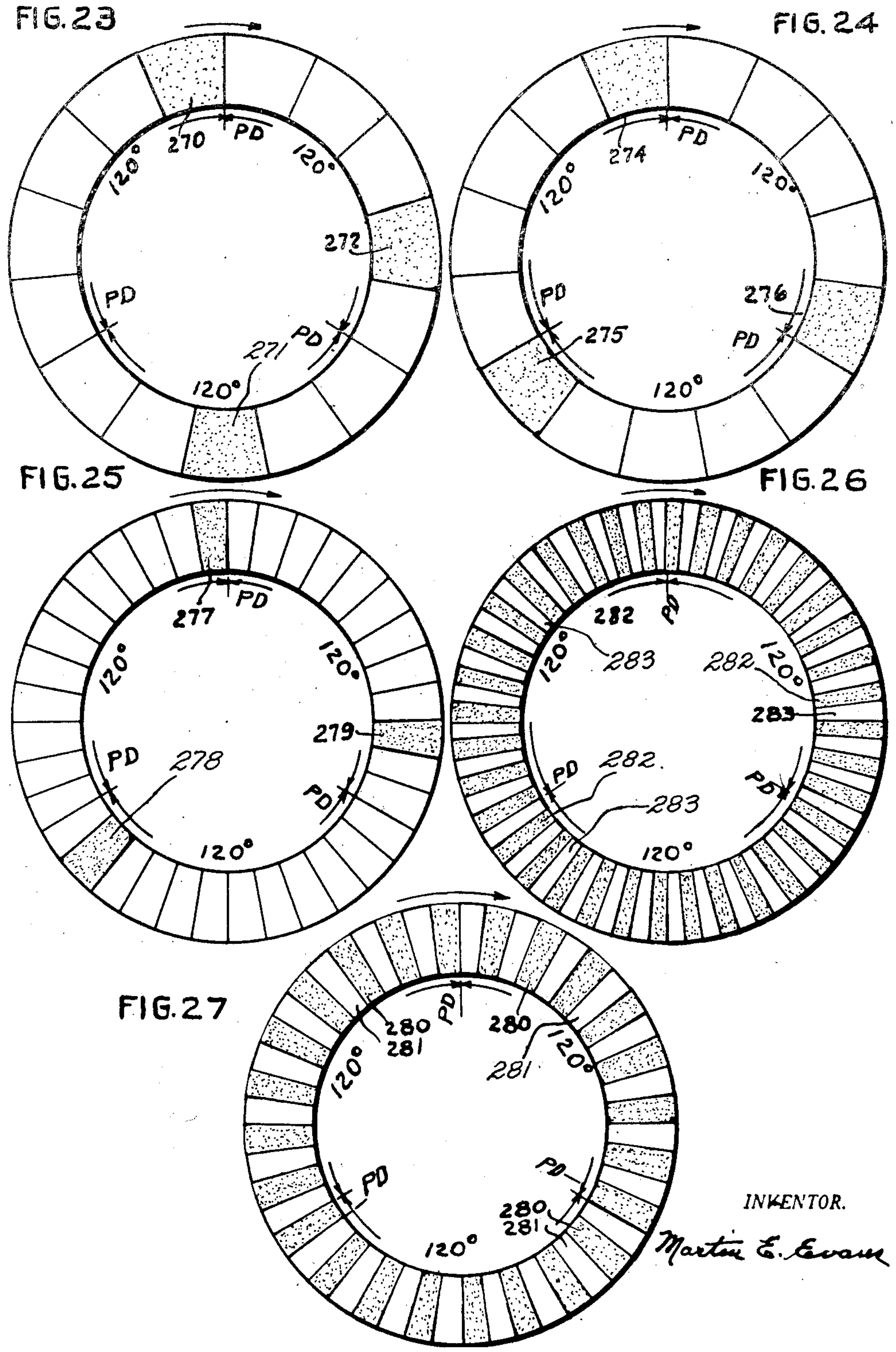

Fig. 23 is a back view of a light control chart for recording photographically 30 frame televised 3 color values occurring in varied sequence for 6 frame camera action.

Fig. 24 is a back view of a light control chart for 3 color values occurring in regular sequence for varied camera frame rates.

Fig. 25 is a back view of a light control chart for recording photographically 72 frame rate televised 3 color values at 6 frame rate camera action.

Fig. 26 is a light control chart for standard pictures at 6 frames per second taking by a flash light operating 72 times per second.

Fig. 27 is a light control chart for projecting pictures from a film moved 6 frames per second in the camera.

Figure 28:
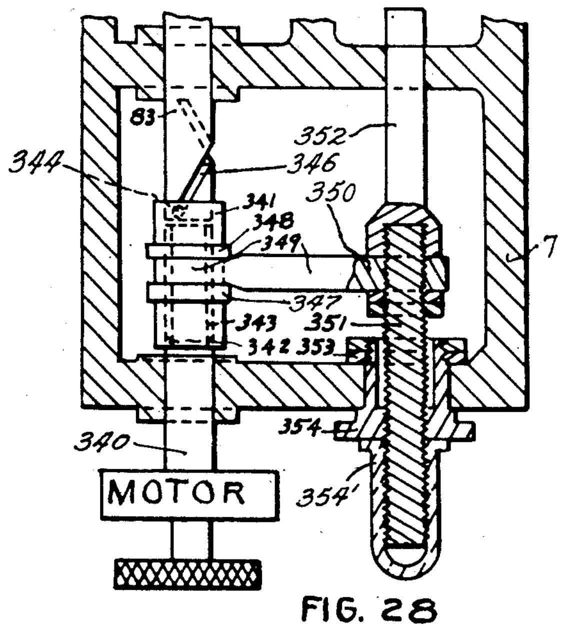

Fig. 28 is a horizontal sectional view of a phasing device between the motor and camera drive shaft.

Figures 29, 30, 31, 32, 33, 34, 35:
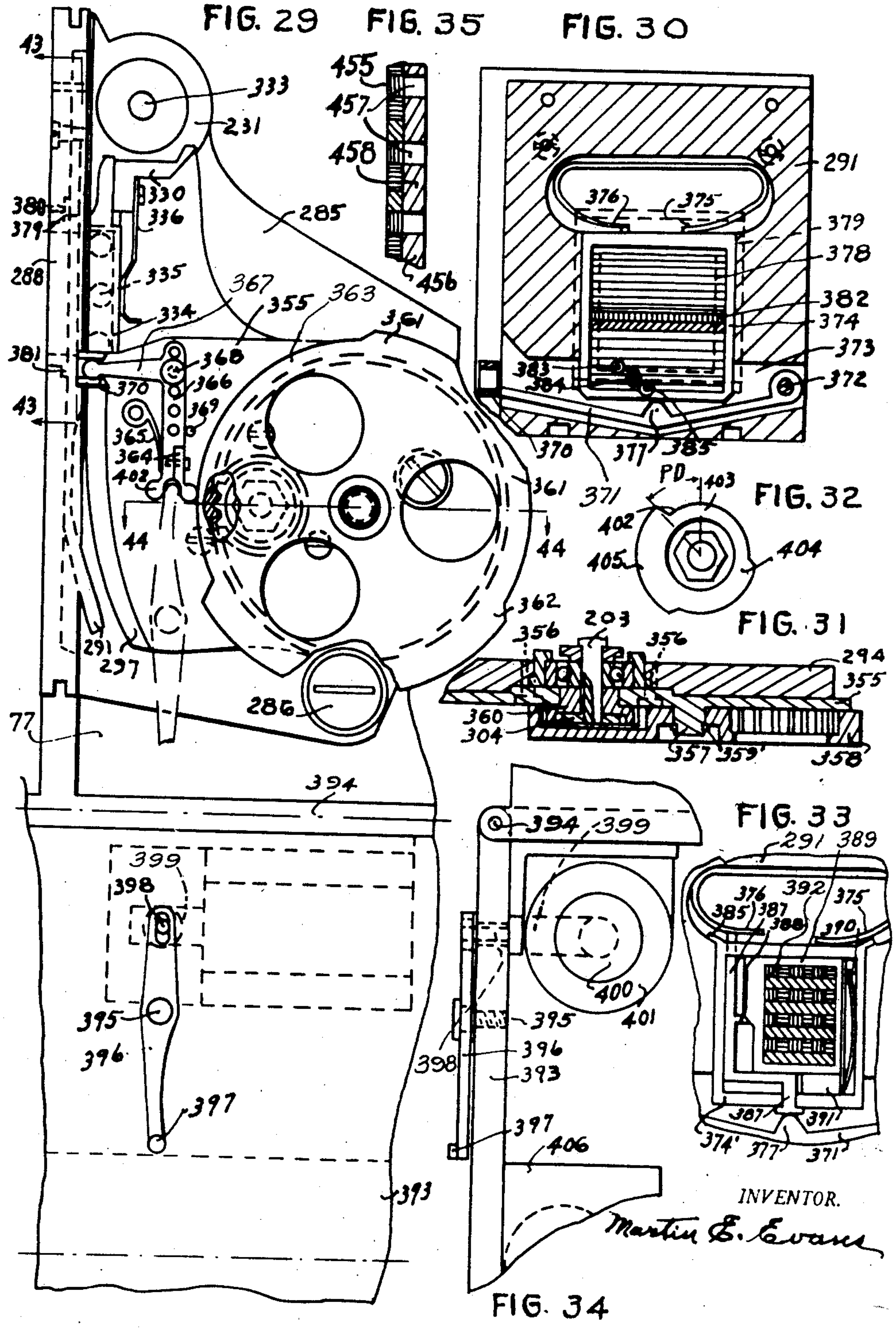

Fig. 29 is a view in vertical elevation of the pull-down mechanism fitted with a color screen and its operating accessories.

Fig. 30 is a vertical sectional view of Fig. 29 along line 43—43 showing the color screen installation.

Fig. 31 is a horizontal sectional view along the line 44—44 of Fig. 29 showing the drive connection for the color screen.

Fig. 32 is a front view of a screen driving cam.

Fig. 33 is another form of color screen with its mounting.

Fig. 34 is an end view of the camera door swung downwardly showing the drive arm for the color screen operative from outside the camera.

Fig. 35 is a cross sectional view through a film and a blanking screen for color.

Figures 1, 2:
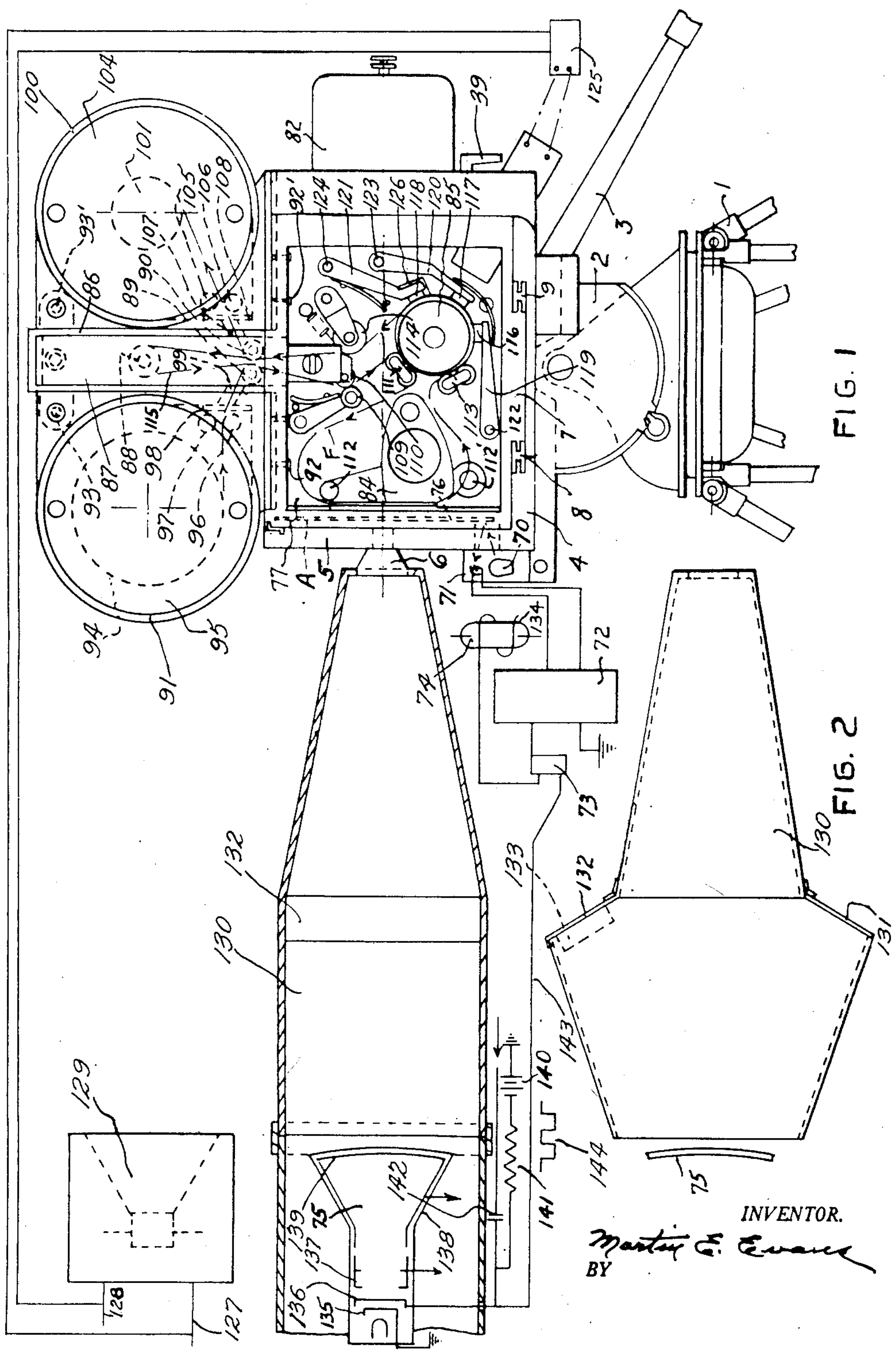
Fig. 1 is a front side view of a motion picture camera mounted on a tripod before a television receiver.
Fig. 2 is a plan view of a dark tunnel isolating extraneous light from that passing from the television receiver tube to the camera of Fig. 1.

Referring to Fig. 1, on a tripod 1 is mounted a pivoted head 2 with an adjusting handle 3. The head 2 carries a camera base 4 with a front upstanding member 5 on which is mounted lens 6. On the camera base 4 rests camera case 7 with grooved beams 8 and 9 between them holding the case and base in sidewise alignment by tongues from the members 4 and 7 fitting the grooves of 8 and 9. The degree of sidewise movement is shown in Fig. 4, where the outline 7' of the camera case 7 rests upon the beams 8 and 9 which are approximately half way extended from the base 4.

Figure 4:
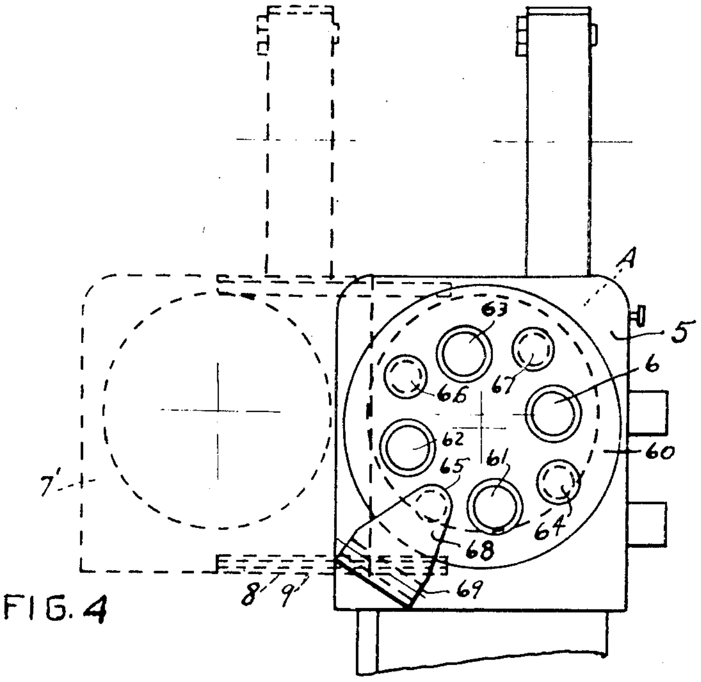
Fig. 4 is a front view of the camera of Fig. 1, showing the camera body shifted to one side to give access to a shutter chamber.
Figure 3:
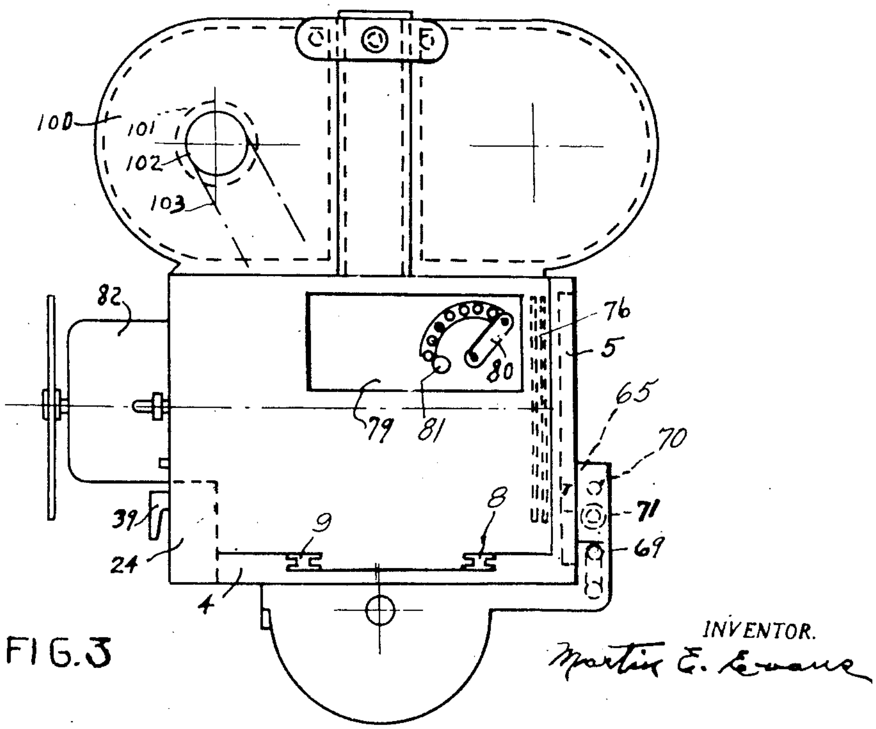
Fig. 3 is a back side view of the camera of Fig. 1.

Referring to Fig. 4, the upstanding member 5 on the base 4 mounts a turret disk 60 which carries four lenses 6, 61, 62, 63, lens 6 being shown in position before the film aperture. Between the lenses enumerated are apertures and removable covers 64, 65, 66 and 67. These apertures extend through the turret disk 60. Upstanding alongside the member 5 is a housing 68 with pivot 69 in the base 4. On pivot 69 member 68 swings away from member 5 to give clearance for rotation of disk 60. In the housing 68 is a light source 70 and a photoelectric tube 71 shielded from each other. As shown in Fig. 3 and elsewhere, light from source 70 passes through aperture 65 to a revolving disk, to be later described, where the light is either absorbed or reflected back to tube 71. Reflected light activates the tube 71 the current from which passes to an amplifier 72 and associated electrical devices. As shown in Fig. 1, from amplifier 72 a line through a switch 73 carries a signal to glow tube 74 or to a television cathode ray tube 75.

The camera case 7 has a front end shutter compartment 76 accessible as previously described, a front side film handling chamber 77, and a rear side gear driving chamber 78 with an adjacent compartment 79 for accessories such as electrical connections, switches, resistances, shutter adjusting lever 80 and clutch control 81. From the motor 82 mounted on the rear of case 7 extends a drive shaft 83 through the gear chamber 78 to the shutter A in compartment 76. Intermediate of the motor and shutter, cross shafts take off power to drive the film pull-down mechanism 84 and the film feed sprocket 85 in the film handling chamber 77.

Referring to Fig. 1, on top of case 7 is a narrow vertical chamber 86 with removable cover 87 and at its bottom connecting approximately midlength with chamber 77. In the chamber 86 is an upper roll 88 and a lower pair of smaller rolls 89 and 90. To the left of the chamber 86 is a film supply magazine 91 held in place by bottom bolts 92 and top bolt 93. In the magazine 91 a film supply reel 94 is rotatably mounted and is accessible by unscrewing of cover plate 95. A pair of rolls 96 and 97 in the magazine 91 guide film as it passes through light trap 98 and aperture 99 into chamber 86 to roll 89. To the right of chamber 86 is a film receiving magazine 100 held in place by bottom bolts 92' and top bolt 93'. In the magazine 100 a film receiving reel 101 is rotatably mounted and power driven through rear pulley 102 and belt 103 shown in Fig. 3. Magazine 100 is closed by screw plate 104. A pair of rolls 105 and 106 in the magazine 100 guide film as it passes from roll 90 on through aperture 107, light trap 108 to receiving reel 101. As the film leaves roll 89 it passes downwardly and between a pair of pressure rolls 109, 110, on to sprocket rolls 111 and sprocket 85, on in a loop to guide roll 112, on through the pull-down mechanism 84 and out to a loose loop, then back over pressure rolls 113 and around sprocket 85 again and upwardly to buckle roller 114 and roll 90. In its passage from roll 89 around the path outlined back to roll 90 the film was in contact with an endless belt 115 which extends additionally from roll 90 up around roll 88 and back to roll 89 to complete the endless circuit. The belt is perforated and engages the sprocket and pull-down mechanism the same as standard perforated film. When standard film is used the belt and film act as a unit. By matching the perforations the belt acts as a self threading device through the film handling chamber 77.

On the lower side of pull-down mechanism is a mounting 112' for a second guide roll 112, thus providing inlet and exit rolls for film and belt to accommodate tight operation of the belt through the pull-down passage for high speed continuous operation in connection with stroboscopic photography.

Again referring to Fig. 1, around the feed sprocket 85 magnetic heads 116, 117, 118 are on arms 119, 120, 121 respectively, which are hinged on pins 122, 123, 124 respectively, and spring pressed against the film F on sprocket 85 and an associated guide as the film lifts from the sprocket. The film F carries material suitable for magnetic action by the heads to provide a sound record to accompany the film and be available for immediate replay. Head 116 is an erase coil fed with high frequency energy to demagnetize the recording material. Recording head 117 contains a main audio winding and an auxiliary high frequency coil, the latter in series with the erase coil to secure proper high frequency excitation. The audio winding is preferably energized with signal current from an audio amplifier 125. Head 118 which carries a shield 126 to isolate it from the recording head, supplies an amplifier, not shown, from which the sounds being recorded are recreated and thus an immediate check on the recording is provided.

As shown in Fig. 1, the camera is set up to photograph a television receiver cathode tube screen 139. The accompanying sound signals for the receiver are supplied by leads 127 and 128 to loud speaker 129 from which leads extend to amplifier 125 and to head 117 for recording action on the photographic film. A dark tunnel 130, shown in plan in Fig. 2, and in vertical section in Fig. 1, excludes extraneous light from the lens 6 and tube 75. Access to the tunnel 130 is provided with side doors 131 and 132 which may be opened to provide a full view of tube 75. On door 132 is shown a light meter 133 for gauging the actinic value of the tube 75.

The original television images are usually lacking in contrast, therefore, it is desirable to exclude extraneous light to take full advantage of the contrast of the image on the screen.

A suitable circuit for energizing flash tube 74 is set forth page 260 of Fluorescent Lamps, Forsythe and Adams, 1948 edition. The coil 134 around the tube 74 is a so called "electric finger" to initiate the action of the tube. The action of the electronic switch for the finger 134 will be described later.

A suitable circuit for controlling the cathode ray tube 75 fits into the television circuits of the tube 75 which may be of the type having an indirectly heated cathode 135 and a control grid 136, a first anode 137 and a second anode 138. The picture appears on fluorescent screen 139. By means of a suitable battery 140 connected in series with a grid resistor 141 the grid 136 may be kept at a suitable negative bias. Through a coupling condenser 142 picture signals are imposed upon the control grid 136. To blank the tube the grid 136 may be driven highly negative by negative impulses generated by light 70 and photo-electric tube 71 utilizing light reflected from the source 70 to the tube 71 by shutter arrangement A in shutter compartment 76 of case 7. Other equally effective control circuits to tube 75 may be employed, utilizing the shutter switch. When the tube 75 is of the character provided by the previously mentioned Patent 2,330,171, wherein the image as traced by the electron beam is invisible and is made visible by a light from the outside source, the light 74 through open door 131 in the tunnel 130 is adapted to control the image on that tube. The switch 73 provides for shifting from control for one tube to control for the other.

The photo-electric tube 71 is connected to the ingoing circuit of amplifier 72 in the outgoing circuit of which negative impulses are carried through a conductor 143 to the control grid 136. These impulses are represented at 144.

Operations of the tubes will be described later in connection with the shutter A in the shutter chamber.

Figures 5, 7, 8:
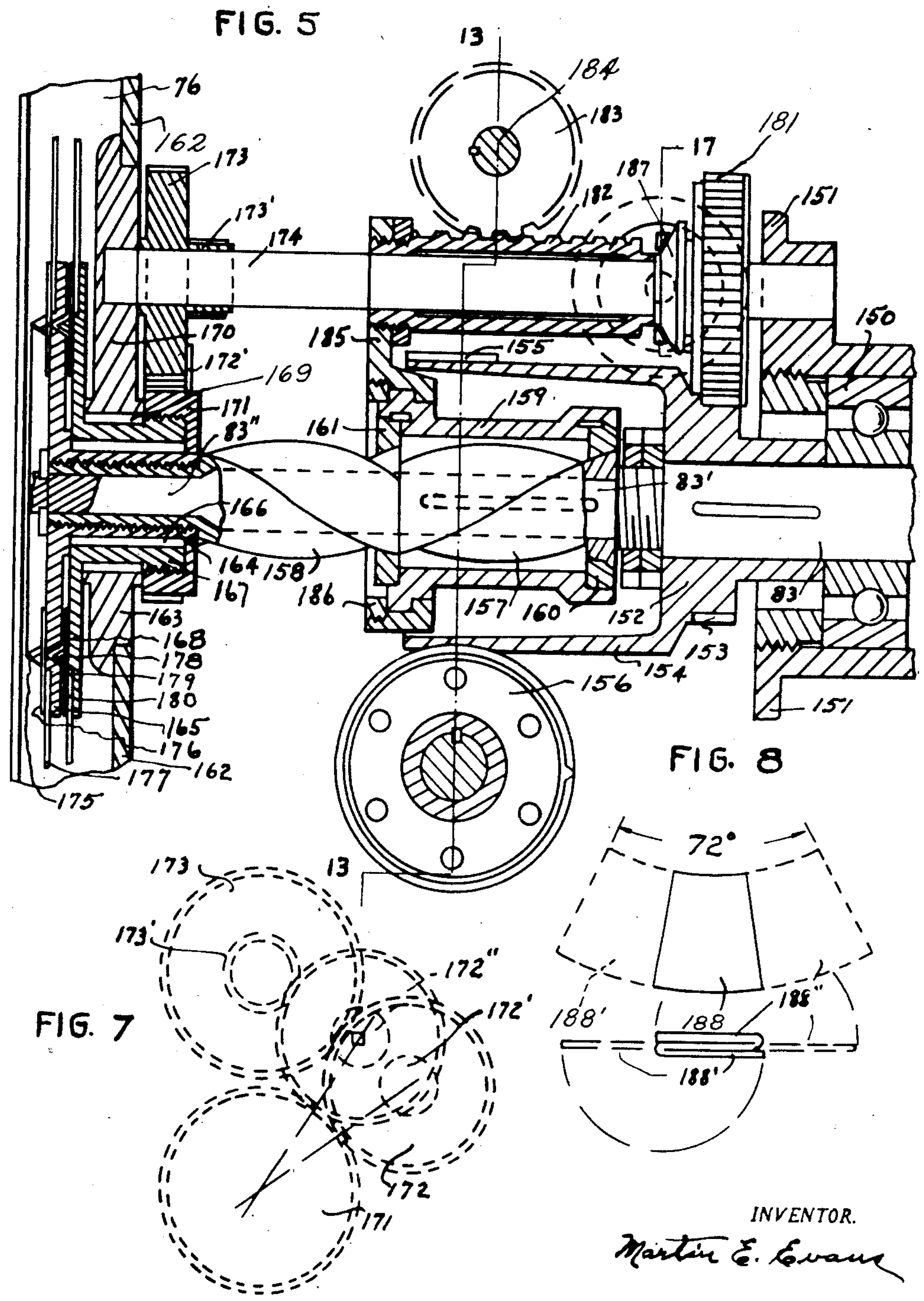
Fig. 5 is a partial vertical sectional view of the camera shutter and drive along the center of the shutter drive shaft.
Fig. 7 is a gear diagram of the final gear connection to the camera shutter.
Fig. 8 is a layout of a sector for the shutter.
Figure 13:
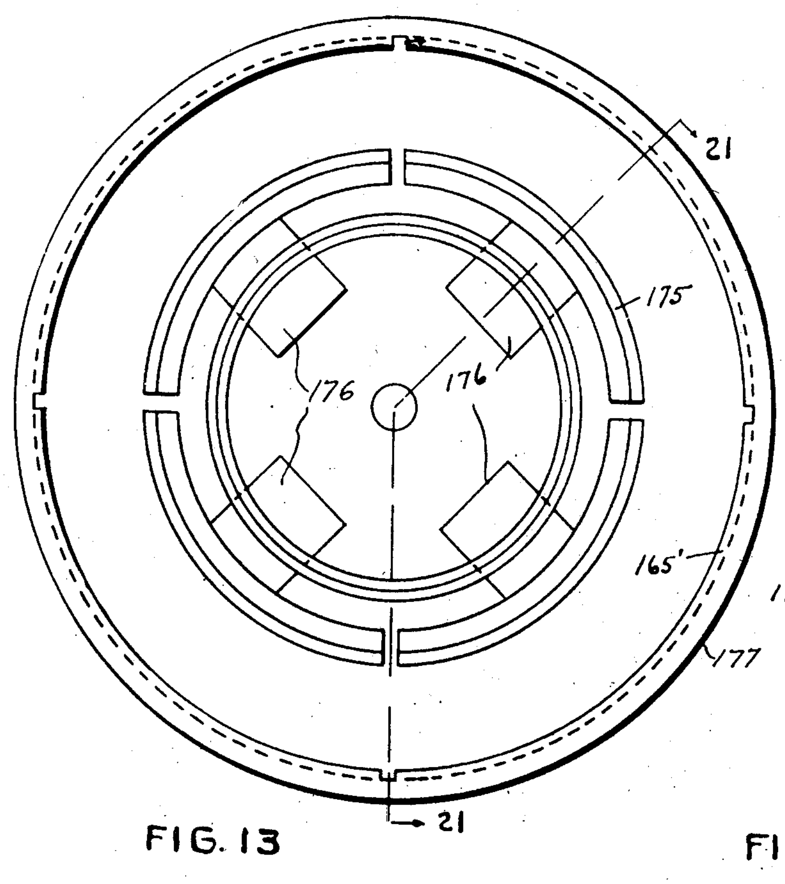
Fig. 13 is a front view of a shutter ring.
Figure 14:
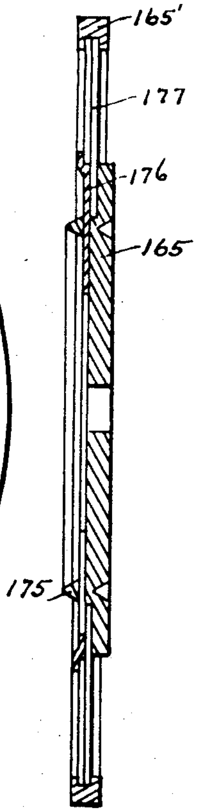
Fig. 14 is a sectional view along line 21—21 of Fig. 13.

Referring to Fig. 5, a longitudinal drive shaft 83 is shown supported by bearing 150 in a cross wall 151 in the gear chamber 78. Fastened to the shaft 83 is a hub 152 carrying a gear 153 on its periphery and a tube extension 154 with an exterior gear 155. The gear 155 meshes angularly with gear 156 fastened to a cross shaft which drives the pull-down mechanism later to be described. On an extension 83′ to shaft 83 and having a reduced diameter is a compound screw of two members 157 and 158. These screw members are in end to end relation to each other, member 157 being keyed to shaft 83′ and member 158 being rotatably mounted on the same shaft. As shown in Fig. 13, members 157 and 158 are of square cross-section with the sides forming helices in relation to their axes. The direction of the helix of member 157 is the opposite to that of member 158. A tubular member 159 at one end carries a nut 160 fitting the helix of member 157 and at the other end a nut 161 fitting the helix of member 158. Members 159, 160 and 161 act as a long slidable nut over both helices and within the tubular member 154. Beyond the helix 158 shaft 83′ extends in a reduced diameter section 83″ through wall 162 and bearing plate 163. On the shaft section of 158 is screwed the hub 164 of exterior shutter disk 165. Around the hub 164 a series of bearing rolls 166 are held by the hub 167 of interior shutter disk 168. Around the hub 167 a series of bearing rolls 169 are held by bearing 170 in the bearing plate 163. The rolls are held from longitudinal movement by member 171 screwed on hub 167 and which carries a gear on its rim. Gear member 171 through an intermediate gear 172 is driven by a change gear 173—173′ on shaft 174 supported at one end in bearing plate 163. The intermediate gear 172 is supported on a two position stud pin 172′. The gears 173 and 173′ have a 3 to 1 circumferential ratio and are adapted to be interchangeable in their position on shaft 174. The pin 172′ occupies the position 172″ when the intermediate gear 172 is in mesh with gear 173′. The gear arrangement drives the shutters in opposite directions of rotation and at the same rate when gear 173 is active but at a 3 to 1 rate when gear 173′ is active. The shutter disk 165 is provided with a circumferential groove on the back face thereof and opposite the groove a rib 175 on the front face. Slots in the rib 175 accommodate holding plates 176 which press circumferential member 177 against the shutter disk 165. Circumferential rib 178 on the front face of shutter disk 168 meshes with the groove in the back of disk 165. Slots in the rib 178 accommodate holding plates 179 which press circumferential member 180 against disk 168. Grooved rims 165′ and 168′ are positioned around the outer edges of members 177 and 180 respectively and have radial slots cooperating with radially disposed slots between members 176 and 179 respectively to hold in place sectors of a nature later described. This construction is shown in Figs. 13 and 14.

The rear end of shaft 174 is carried in a bearing in cross wall 151. The shaft is driven through a clutch by gear 181 meshing with gear 153. Slidably mounted on shaft 174 is a rack member 182 operated by a meshing gear 183 connected to shaft 184 supported in the longitudinal wall of gear chamber 78. The shaft 184 carries an exterior arm 190, Fig. 6, having a stop pin 191 in the end thereof spring pressed against a positioning quadrant 192 adjacent thereto. A yoke 185 at one end is screwed and locked to rack 182 and at the other end encircles tubular nut member 159 with a bearing having retaining ring 186. The bearing is adapted to impart longitudinal motion to the nut 159 while accommodating nut rotation. Such longitudinal movement is effected by movement of gear 183 and acts to rotate members 157, 158 and the attached front shutter disk 165 relative to the drive shaft 83 and its extensions. As shown in Fig. 5 the rear end of rack 182 is adjacent to the face 187 of the clutch cone 211 and in a position to hold the clutch out of gear with the result that the rim gear 181 turns idly upon the clutch structure.

Figures 6, 9:
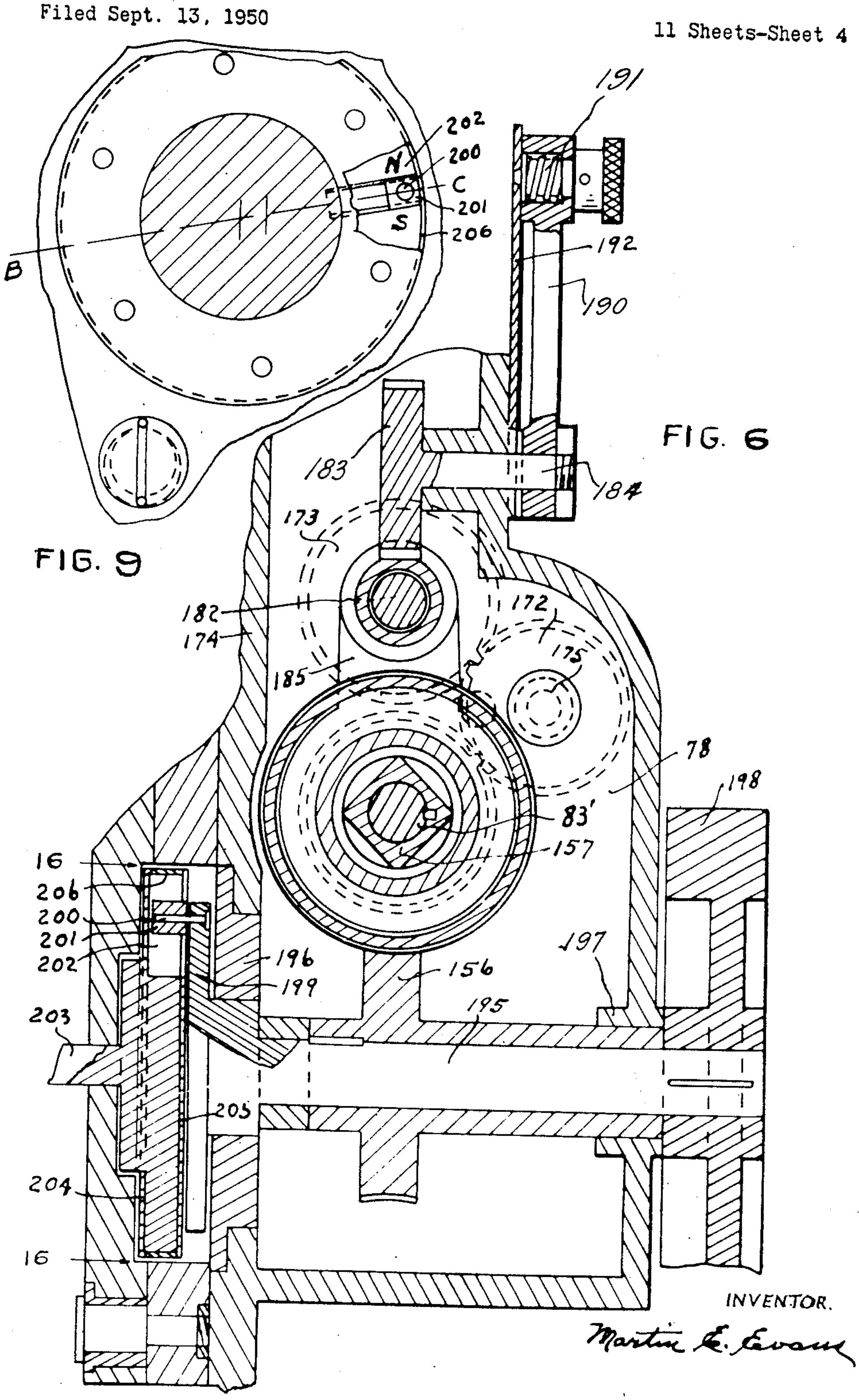
Fig. 6 is a sectional view along line 13—13 of Fig. 5.
Fig. 9 is a vertical sectional view of Fig. 13 along line 16—16 showing a driving connection to the pull-down mechanism.

The shutter members 177 and 180 are variously constituted, in some cases of solid metal, in other cases of transparent material and with pellicle mirror coatings and with light obstructing sectors with suitable retaining means. The smallest light obstructing sector provided is of 24° width shown in Fig. 8, where member 188 is shown in plan and end elevation. It is a folded 72° section of a ring having 24° sections 188′ and 188″ folded over the middle 24° section. Suitable positioning means for sector 188 on the shutter are provided, as shown in Figs. 13 and 14, by slots in rim 165′ and matching spaces between members 176 through which the sector is fed to the retaining grooves. In operation cone 211 may disengage the clutch throwing shutter member 180 into open idle position. Then lever 190 controlling shutter member 177 may be operated quickly to make a single exposure when such is desired. Referring to Fig. 6, the gear 156 is supported on shaft 195 having a bearing plate 196 adjacent the pull-down mechanism and bearing 197. The bearing 197 supports the overhung flywheel 198 on extension of shaft 195. Adjacent the bearing plate 196 is an over-hung disk extension 199 of shaft 195 carrying a crank pin 200 supporting a drive block 201. The block 201 fits into a disk 202 on shaft 203 which operates the pull-down mechanism 84. The connection between the block and the disk 202 is in the nature of a radial slot covered wholly on one side by disk plate 204, partially on the other side by disk plate 205 and endwise by ring 206. The alignment of the shaft 203 relative to shaft 195 is offset so that the action of the drive pin and block is to provide an acceleration of rotary movement of shaft 203 on its down drive of the pull-down mechanism 84. As shown in Fig. 9, the sides of the slot for block 201 are of the nature of a magnet having N and S poles between which the block may be held in radial position when the pull-down assembly is removed from pin 200. Pin 200 may be removed when the camera is to be used at ultra high speeds and the pull-down is immobilized in which case the belt 115 operates continuously around guide rolls 112 and 112′. The offset of shafts 195 and 203 relative to each other and to the median line of the pull-down action is shown on line B—C in Fig. 9.

Figures 10, 11, 12:
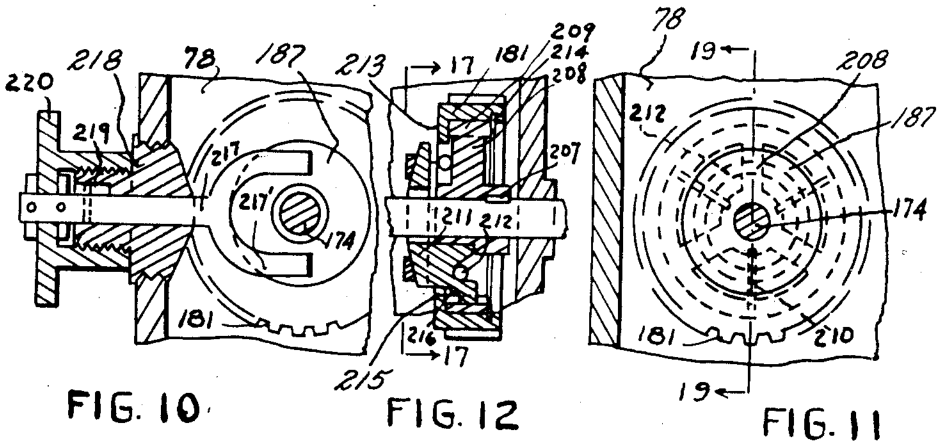
Fig. 10 is a vertical sectional view of Fig. 5 along line 17—17 showing the stop control for the rear shutter sector.
Fig. 11 is a vertical partial sectional view showing the clutch drive for the rear shutter sector.
Fig. 12 is a vertical sectional view along line 19—19 of Fig. 18 showing the clutch drive.

Referring to Figs. 10, 11 and 12, on shaft 174 is securely mounted hub 207 with three radial arms 208 extending to ring 209 supporting gear 181. Gear 181 is retained in position by flange 213 and snap ring 214. In the hub 207 are axial slots supporting wings 210 which extend radially to guide slots in ring 209. The wings 210 extend from cone member 211. Between the wings 210 and the arms 208 is a spring ring 212 which tends to hold the shoulders 216 of wings 210 in engagement with notches 215 in the gear flange 213 of gear 181. Against cone 211 is mounted a fork 217′ with stem 217 extending at right angles to shaft 174 and through a supporting bushing 218 in the wall of gear chamber 78. The bushing 218 has an extension 219 internally slotted in which slides a pin through stem 217 to keep the latter from rotating. On the extension 219 is threaded a bushing 220 through which extends the stem 217. Through the stem extends a pair of pins, one on each side of the bushing 220 permitting the latter to rotate freely but transmitting axial movement to the stem 217 and thus to the fork 217′ for adjusting the clutch. The clutch as shown is out of engagement. The clutch is also operated by the rack 182 but the mechanism just described is necessary to hold the clutch when the rack is removed from the cone 211.

Figures 15, 16:
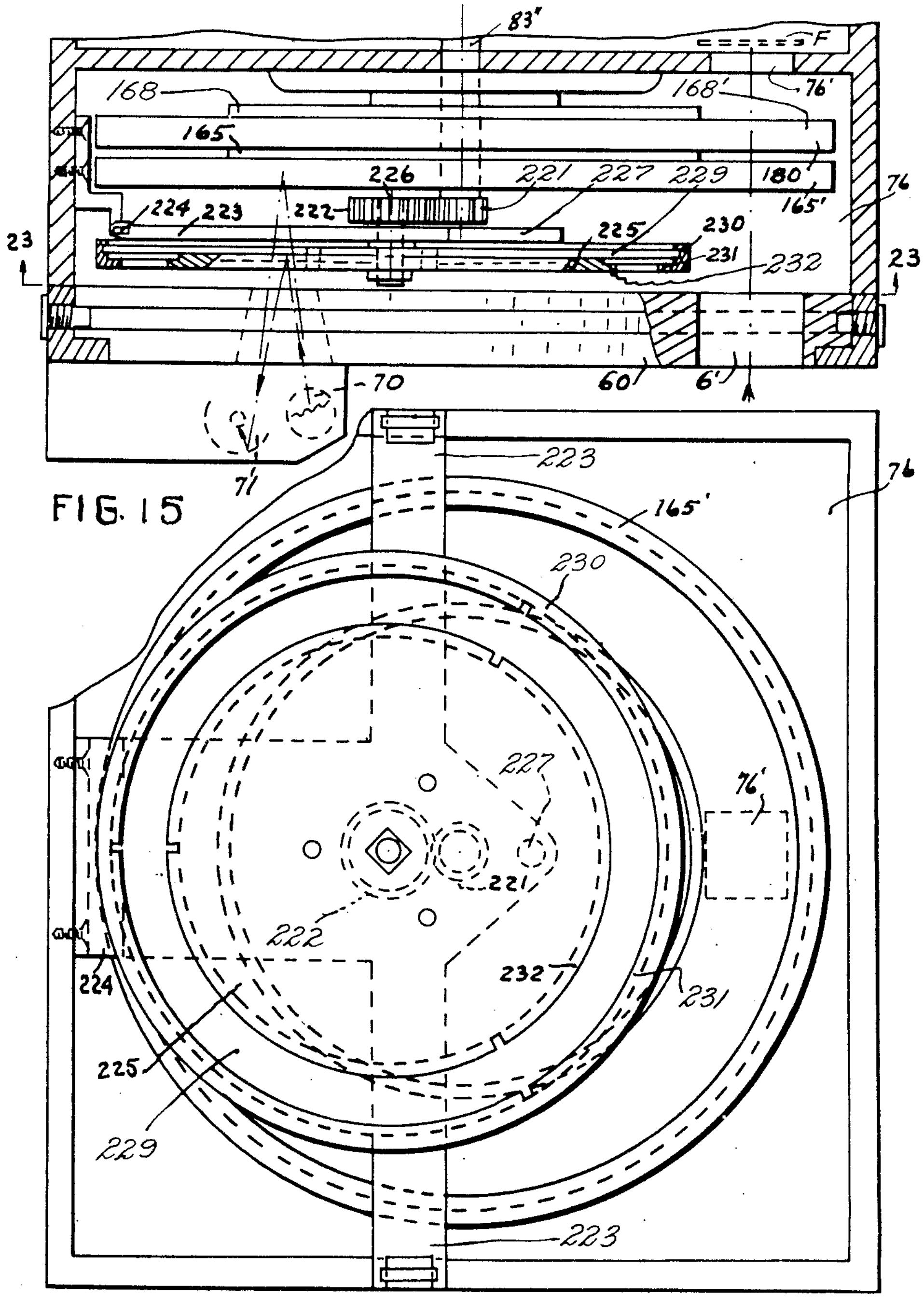
Fig. 15 is a partial horizontal sectional view through the camera shutter chamber.
Fig. 16 is a front view of the shutter chamber when open.

Referring to Figs. 15 and 16, in shutter compartment 76, the drive shaft 83″ is extended to carry a pinion gear 221 in mesh with gear 222 mounted on a support 223 hinged at 224 to the side wall of the compartment 76 and releasably anchored at the top and bottom of the compartment. The gear 222 is carried on a stud shaft 226 extending through a bearing in support member 223. On the front side of the support 223 a rotating disk 225 is mounted on the shaft 226. The disk center is offset to the left from the shutter center to clear the light apertures 6' of the lens turret 60 and 76' adjacent the film. The gear ratio of the gears 222 and 221 is 3 to 1 so that the disk rotates one third as fast as the shutter disks. The shaft support 223 is provided with a bearing 227 offset to the right of the shutter center for supporting the disk in suitable position to rotate in front of the exposure aperture when such operation is desired. The disk is a composite arrangement of a metal drive plate 225 pressed against a transparent plate 229 pressed against a shoulder on shaft 226 by the nut thereon. Pins from the metal plate fit suitable apertures in the transparent plate to maintain joint rotary movement. A rim 230 around the circumference of the plate 229 has an inward flange 231 spaced to provide a circumferential recess. A flange 232 on the drive plate 225 is spaced from the plate 229 to form a circumferential recess, the recesses by flanges 231 and 232 face each other and cooperate to retain therein charts of suitable material and design inserted through radial slots suitable placed. Aperture 76' in the shutter compartment is positioned in alignment with the aperture 6' in lens turret 60. The charts for the disk 225 operate the electronic switch comprising light source 70 and photo-electric tube 71 and associated electrical agencies for timing the operation of flash lights, cathode ray tube scanning, and shifting of color screens in the camera as later described.

In the absence of the members mounted on shaft 226, disks may be mounted on the first shutter member 177 in which case light from source 70 will be reflected to member 71 as shown by the lines between the members noted. Referring to Figs. 15 and 16 in Fig. 1, where the camera is set up to photograph a television tube 75, and assuming that the camera is to take black and white pictures at the rate of 24 frames per second, inspection of the graph in Fig. 17 under heading 24 shows that full and fractional fields fit together to give two field periods between pull-down periods. The 72° shutter blanks out a half field for every picture frame, so that the shutter performance is satisfactory without control of the television electron beam. However, the television electron beam starts at the top of the tube and travels back and forth horizontally leaving a space between tracings until the bottom of the tube is reached, then is goes back to the top and traces between the lines previously made. Inspected through the camera lens, the top or first line appears at the bottom of the camera frame, therefore, the shutter should open from the lower side upwardly since it is behind the lens, this to avoid any exposure delay due to the opening action of the shutter. To accomplish this the two 72° disks are disposed one in structure 165' and one in structure 168' so that their trailing edges separate at the lower side of aperture opening 73' of Figs. 15 and 16. Further, the tracing of the electron beam ends at the bottom of its frame and the light therefrom appears at the top of the picture frame, and the 72° sector closing down on the top side will cut off this action by an amount represented by the angular width of the photo frame, whatever it may be, says "*a*." It is accordingly necessary to remove an angular segment of the value "*a*" from the clockwise moving 72° sector which now becomes 72°—*a* in angular value. Now clockwise moving sector 72°—*a* and counterclockwise moving 72° sector close down on aperture 76' from opposite sides and meet at the middle. So it is, that the aperture opens without detriment to the exposure and closes in a period less than the opening time.

Normally the two 72° sectors open the aperture on its horizontal center line and close on the same line thereby opening and closing in one-half those times for a single sector.

Figures 17, 18:
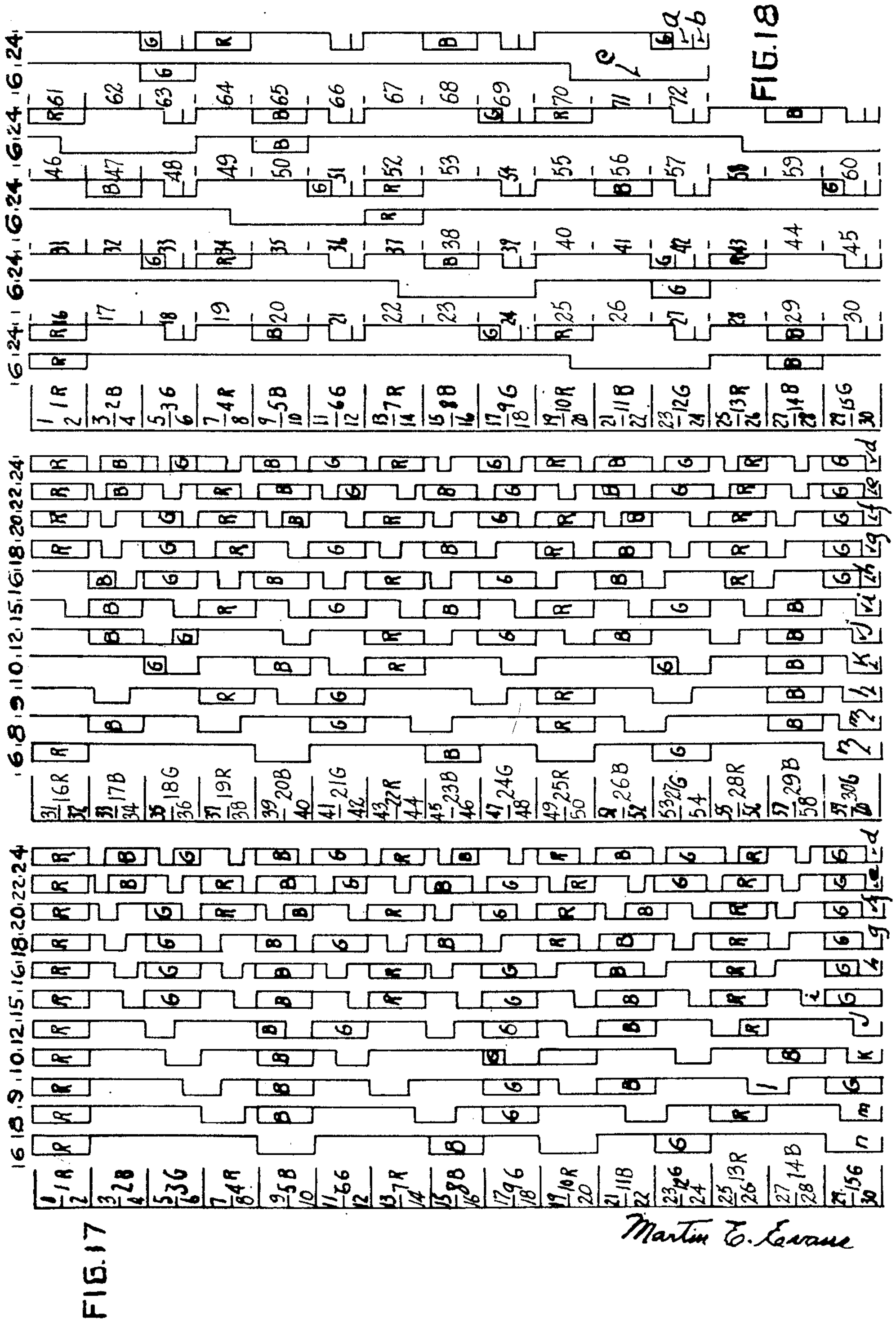
Fig. 17 is a divided time chart showing the relation between events on a 30 frame television tube screen and the operative activities of a motion picture machine operating at various rates.
Fig. 18 is a chart similar to Fig. 24 for a television rate of 72 frames per second.

Again assuming that the camera is to take color values at a 24 frame rate, an inspection of Fig. 17 graph 24 shows that action of the mechanical shutter alone is insufficient to limit camera recording to single color values on a camera frame. Also, the sequential appearance of the colors is unsatisfactory at that frame rate. To get proper color value recording at 24 frame rate it is necessary to record at a lesser rate and to convert to the desired rate of 24. The rates and conversion repetitions are evident from perusal of graphs of Figs. 17 and 18.

Figures 19, 20:
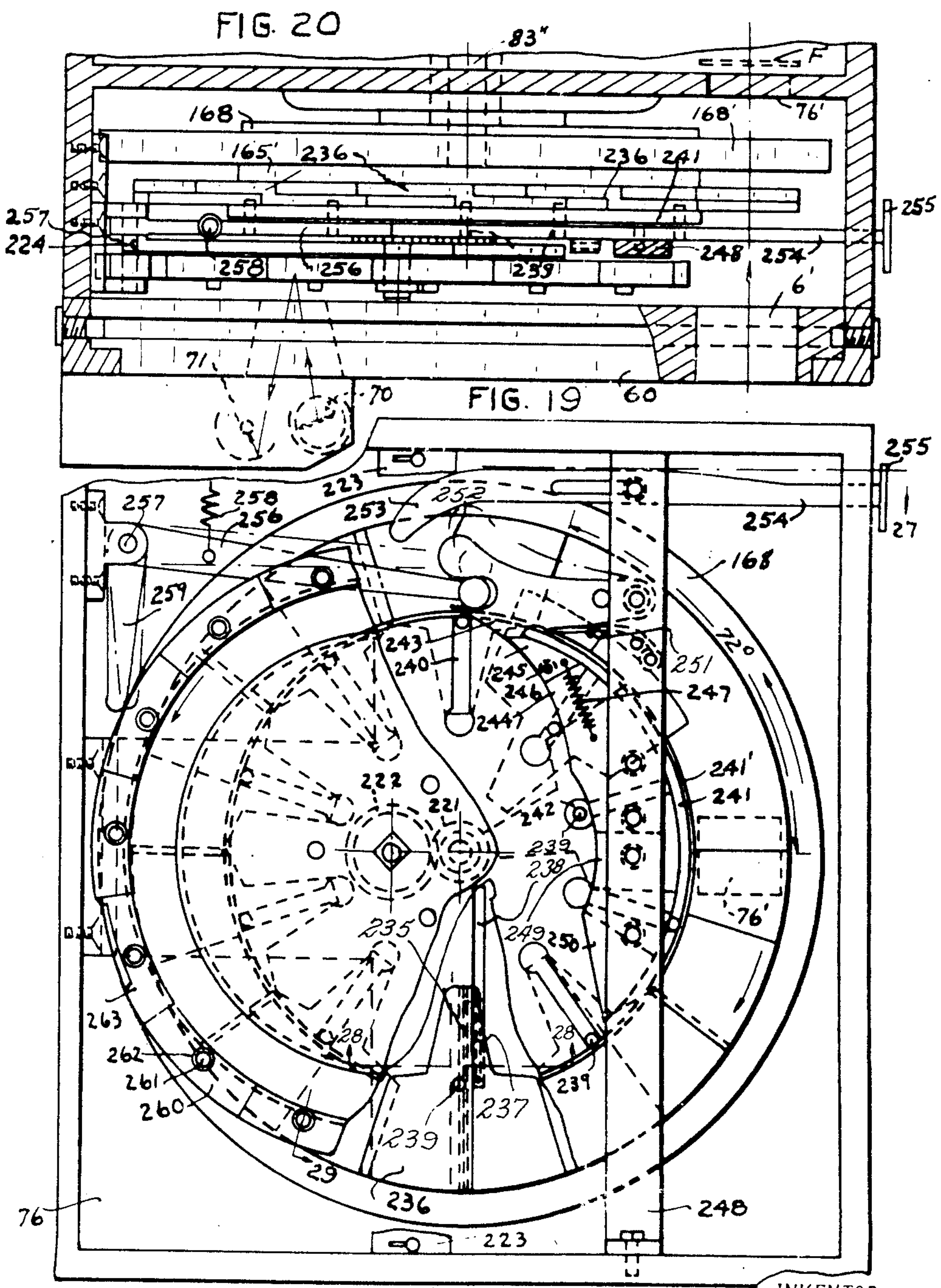
Fig. 19 is a front view of the preferred form of shutter with the shutter chamber open.
Fig. 20 is a partial horizontal sectional view through the shutter chamber on line 27—27 of Fig. 19.
Figure 22:
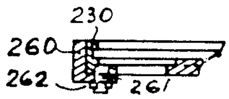
Fig. 22 is a sectional view of Fig. 26 along line 29—29 showing the cam sector for light control.
Figure 21:
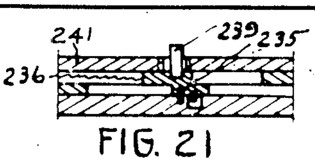
Fig. 21 is a sectional view of the Fig. 19 along line 28—28 showing overlap of radially movable sectors.

A preferred form of shutter is shown in Figs. 19 and 20. Disk 168 is driven by shaft and gears previously described. Disk 165' occupies the position of disk 165 previously described and is driven by the same members. Disk 165' is provided with radial inserts 235 at regular intervals which protrude sufficiently to form guides to overlying sectors 236 by fitting into grooves in the adjacent parts of the sectors and to propel the sectors in a rotary direction around the disk axis. Alongside the inserts 235 are grooves 238 extending radially to near the disk center in each of which is an extension spring 237 anchored at its outer end to disk 165' and at its inner end to the tail end of the sector 236. The sector 236 is fan shaped with the leading edge over-lapping the trailing edge of the adjacent advance sector. The overlap is just sufficient to complete the complete coverage of the shutter. The sector by reason of the overlap lies in two planes originating in the vicinity of the groove riding the insert 235. The two plane arrangement accommodates radial movement of the sector under impetus to an upstanding pin 239 at the approximate mid point of the sector. Pins 239 travel in slots 240 in a cover plate 241 over the sectors and are restrained at the outer edge of plate 241 by a rubber band 241' therearound which acts as a shock absorber to outward movement of sections 236. At their inner ends slots 240 are enlarged to receive a ring 242 placed over a pin 239 to hold the sector at the inner point of travel. When the pins 239 are positioned with the rings 242 in place the springs 237 are extended in the slots 238 and urge the rings against the plate radially. The pins 239 extend beyond the plate 241 a distance sufficient to engage a pair of cams 243 and 244. Between these two members is a bridging cam 245 hinged at 246 to cam 244 and held by spring 247 to accommodate backward rotation of the sectors 236. Cam 244 is supported on upright 248 attached to the top and bottom of the chamber 76. Cam 244 has lower extensions 249 and 250 removably supported on upright 248. Cam 243 is pivoted on upright 248 and urged upwardly by spring 251. When the cam member 243 is in its upper position, an extension 252 contacts the angular portion 253 of a horizontal bar 254 slidably mounted on upright 248 and extending through the wall of chamber 76 to an operating knob 255. Below the extension 252 is a slot into which fits the end of an arm 256 mounted on one end of shaft 257 supported from the chamber wall. The arm 256 is urged upwardly by spring 258. On the other end of shaft 257 is mounted a depending arm 259 the free end of which contacts the circumferential surface of a series of cams 260 fastened by pins 261 and snap rings 262 to the rim 230 of the chart carrying combination. In place of cams 260 which maintain the arm 259 in an outward position and the arm 256 in a downward position, cams 263 are provided at suitable intervals to permit the arm 259 to move to the right, thus allowing spring 258 to raise arm 256 and cam 243 to permit pins 239 to pass to the outward face of cams 243 and 244.

With gears 221 and 222 operative the cams 260 rotate only one third of their circumferential path for each revolution of a sector 236 of the shutter. This gives three separate controls of the sectors 236. By dividing the one third path into five sections, each section represents 72° travel of the sector shutter, so that the length of sector 263 represents 72° on the shutter or two shutter elements 236. The space between adjacent pins 239 on elements 236 is 36° as illustrated so that the cam 263 has ample time to operate cam 243 to direct the pins 239 to a selected direction relative to guide cams 244 and 245.

The pins 239 being urged outwardly by springs 237 approach the cam 243 in a direction to receive shockless pressure to the inner face of cams 245 and 244 when the came 243 is in down position as illustrated in Fig. 19. This inner path of the pins retracts the sectors 236 from over the aperture 76'. The retraction has a lead over the appearance of the sector in the vicinity of the aperture determined by the lead position of sector 263. When the cam 243 is in a raised position as in response to action of sector 263, the pins 239 pass to the outer faces of cams 244 and 245 and the sectors to which the pins belong pass over the aperture 76'. As the pins pass over the inner faces of cams 249 and 250 the sectors pass beyond the aperture area and are eased back by cam 250 to the outer sector positions. Removal of cams 249 and 250 permit the pins 239 to spurt to their outer position before the sector has cleared the aperture 76' and this is done for very short exposures at slow frame operation. The radial impact of the sector is absorbed by band 241' in contact with pins 239.

Referring to Figs. 19 to 22 inclusive, some of the operative arrangements are to be considered, as for example, shutter adjustments for projection operation. With all the pins 239 retracted radially and rings 242 thereon in plate 241 holding the sectors 236 away from aperture 76', and with rotary member 168 out of operative engagement by fork 217', the apertures 6' and 76' are cleared for projection operation, since the plate 168' is transparent and the light obstructing 72° segment thereon is positioned aside from the apertures when the fork 217' is as noted. Under these conditions and with a suitable flash disk held by flanges 231 and 232, rotation of the shutter through reflection of light from source 70 to member 71 effects suitable flashing of tube 74 mounted on the side of the camera temporarily. Light from the tube 74 reflected through the film passes through a suitable lens on turret 60 and on to a suitable screen not shown.

Again, consider rotary member 168 out of operation as just described and disk 165' in operation. Then referring to the cams 260 and 263, these may be arranged to retract or not retract segments 236 to the desired extent in increments of 36° of shutter angular movement to give the desired exposure. Flash controls may be activated if desired.

To summarize, the foregoing mentioned retracted position of the shutter segments, Figs. 26 to 29, permits the shutter to run openly continuously. The previously mentioned successive retraction of the shutter segments also permits the shutter to run openly continuously. The switch 73 permits the shutter switch to influence the time of image showing by the tube 75. The charts, Figs. 23 to 27, time the operation of the shutter switch and so through switch 73 the appearance periods of the images on tube 75 to accommodate movement of the film for successive picture frames when the shutter is running open continuously. Charts Figs. 23 to 25 provide one operation of the shutter switch during one picture frame time interval. Charts Figs. 26 and 27 provide plural operations of the shutter switch during one picture frame time interval. Inspection of the reflecting sections 270, 277, 280 and 282 of these charts for comparison of their widths shows their variations. It is obvious that these variations provide a plurality of switching intervals and that these reflecting members applied to the fast moving periphery of the shutter or to the relatively more slowly moving gear driven chart disk 225, Fig. 15, variably time the non-appearance interval of the image on the tube to conform to the photographic requirements. The duration of this interval is recorded graphically in charts, Figs. 17 and 18, for various frame rates in black and white and in color. The shutter, charts and switching arrangement also adapt the camera to intermittent lighting control for regular photography.

Again, color recording in black and white is taken as the operation desired. With gear 173' in operation and with red, green and blue color filters positioned on transparent disk 180 which now rotates 120° for each revolution of the shutter drive member 165', each exposure by shutter sectors 236 registers a primary color value which is recognizable on the developed film by reason of the position or outline of members 383, 384, 385, shown in Fig. 30.

Again, consider multiple shutter operation with flash light in studio work. With gear 173 in operation and a 72° light obstructing sector in position against disk 180, with drive disk 165' operative with two sectors obstructing passage of light through apertures 6' and 76' and with shutter rotation 24 times per second, the exposure is 1/30 second; flash operation 24 times per second would give a single exposure per camera picture; however, the rate of flashing is objectionable. At least 48 flashes per second and preferably 72 per second of tube 74 are desirable by means of suitable flash disks retained by flanges 231 and 232. Assuming that the 72 rate of flashing is operative, it becomes necessary to reduce the period of shutter exposure to 1/72 second to get only one flash on a picture. To this end the aperture by the sectors is changed so that only two sectors 236 are retracted. Since there are three flashes for each frame at 24 frames per second it is necessary to choose which of the three will be utilized. This is done by manipulation of lever 190 so that the sector aperture is in alignment with apertures 6' and 76' when the selected flash occurs, and for the exposure apertures to be covered at other times.

Other operative adjustments and combinations are obvious, those just being mentioned are merely illustrative in a general way, and further elaboration would be tedious.

As illustrative of the charting of problems and their solution by this invention, reference is made to the recording of color television images on film. Figs. 17 and 18 record the time factors involved.

Referring to Fig. 17, this chart is in two divisions headed by frames per second operation of the camera ranging from 6 to 24 frames. Extending downward to the left of the headings are divisions from 1 to 30 in the first and from 31 to 60 inclusive in the second division. These divisions represent time occupied by a television field at the rate of 60 per second. Alongside these divisions are numerals representing the television frame time, two fields being used for a frame. Alongside the frame numbers occur the letters R, B, G, representing red, blue, green, the primary color occurrences which are transmitted by the noted fields and frames of television. The sequence of camera events and relative time periods are depicted in the vertical graph under each camera frame rate. The rectangular boxes represent the exposure periods. The line openings facing the right represent the pull-down periods, and the line openings facing the left represent dark periods additional to the dark pull-down periods. Thus under camera frame rate of 6 per second and opposite the fifth frame which is marked B we find in the graph the opening to the right indicating pull-down period. The pull-down period has been based on the use of a 72° shutter closure, the remaining 288° being open period. Also, the pull-down period is shown to occur after exposure, so it is shown in all cases as the last occurrence in the camera cycle. The color values appear in black and white as first recreated on the receiver tube screen. Hence the need for color screens in photographing the screen is absent. However, an indicator of the segment of color analysis being photographed is necessary and this will be described later whereby the suitable color element is coupled with the photographic record for color reproduction. Under the 6 frame column the first exposure is shown in rectangle R opposite frame 1. The next three frames must be blanked out until the mechanical 72° sector appears for the pull-down blanking. This is accomplished by direction of chart, Fig. 23, inserted in the control grooves provided by parts 231 and 232. The chart is divided into three sections of 120°, each section representing one camera frame. Each section is divided into five parts representing the five television frames occurring during the time interval covered by one camera frame. The sections representing pull-down period are marked PD. Then four out of five segments are available for recording action in accordance with the requirements indicated by chart of Fig. 17. Area 270 is non-reflecting and in passing past the aperture before elements 70 and 71 exerts no action in element 71. The remaining areas in the 120° sector are reflecting and direct light received from 70 to 71 and so blank out the unwanted light on the television screen. After the pull-down period 5B, on chart Fig. 17, two unwanted television frames 6 and 7 occur and are represented by two reflecting areas followed by light non-reflecting area 271 which permits television frame 8 to be photographed. In the third sector, non-reflecting area 272 is preceded by one and followed by three reflecting areas each of which act to blank out unwanted images. The sequence of R, B, G, as thus outlined is observed to continue in the 6 frame graph. Another sequence of R, B, G, in the 6 frame graph is covered by chart, Fig. 24, where non-reflecting areas 274, 275, 276, appear in the same relative positions in their sections as in the above manner. Charts for the camera rates 6 to 24 frames per second may be made up from Fig. 17 graphs.

The choice of camera frame rate for color projection depends upon the ultimate projection rate. For professional theater projection the frame rate is limited to 24 frames per second. The usual conversion from 30 frame rate to 24 frame rate involves split television frames which gives a scrambling of values when applied to color. This invention maintains pure color values by photographing full color frames and then arranging these in suitable combinations for 24 frame projection. Six frame pictures are each repeated four times, eight frame pictures are repeated three times, and twelve frame pictures twice. Fifteen frame pictures are all repeated with a loss of 6 frames from the repetition, such as 1—1—2—2—3—4—4—5—6—6—7—8—8—9—10—10—11—12—12—13—14—14—15—15. This gives repetition of the first two and the last two frames and alternate repetition of the intermediate frames. The method of repetition may be by photoprinting or by control of flash and pull-down mechanism.

Referring to Fig. 18, graphs for camera frame rates of 6 and 24 per second and a television rate of 144 fields or 72 frames per second are presented, similar to Fig. 17. The horizontal line in the pull-down portion of the graph indicates a division of the pull-down time, $a+b$ being the pull-down time for the usual running of the pull-down mechanism, "$b$" being the time for pull-down with overrunning operation, and "$a$" giving the additional interval of television picture made available for photography by the overrunning operation, so that full color fields are recorded as at 9G of the 24 frame rate.

For recording 72 frame television at 6 frame camera rate, reference is made to the chart, Fig. 25, where three 120° sectors are each divided into 12 areas, each area representing the time for a single frame of television. Areas 277, 278, 279, are nonlight reflecting and record R, B, G, respectively. The remaining areas are reflecting and so cut out the images in manner already described. From graph Fig. 18, it is seen that over two television frames occur during pull-down time and that nine are available from which to choose for recording. Taking the first frame for the R recording on the first camera frame, the fourteenth frame for the B recording on the second camera frame and the twenty-seventh frame for G recording on the third camera frame a pattern is established for repetition. The other television frames occuring before the camera must be blanked out by the mechanical shutter and the suplementary electronic device controlled by the chart, Fig. 25.

For photography utilizing flash tube 74, with the camera operating at 6 frames per second and 48 flashes per second, 8 on periods and 8 off periods are required for the control circuit through members 70 and 71. The chart, Fig. 27, is so divided in each of the 120° segments, and areas 280 are non-reflecting while areas 281 are reflecting. The mechanical shutter must be adjusted and phased so that only one flash is recorded on a film frame.

From another aspect, this invention contemplates the use of the camera as a projector in converting say 24 frame film pictures to 30 frame projected pictures, projected on the mosaic of a television pickup tube not shown, where the transmission rate is 60 fields per second, for example. In this event, the pickup tube would occupy a position as of tube 75 in Fig. 1, and the light tube 74 would be mounted on the camera door in its operating position for projection. A control chart for tube 74 for the conversion would be constructed on the basis of providing 60 flash periods and 60 dark periods per second. An examination of the angular displacement of the chart shows that these recurring periods do not arise with the 3 to 1 gear ratio of members 222, 221, of Fig. 19, utilized to drive the chart on disk 229. With a gear ratio of 2 to 1 the chart revolves 12 times per second and has an angular displacement of 4,320 degrees. On the basis of 120 sectors in this interval, each sector would have a 36° angular dimension which can occur periodically in the circumferential path at suitably timed position to effect the required light operation. This assumes equal time intervals of light on and light off, a combined angular dimension of 72°. Now the periods of on and off are not equal. The on period must be brief, and occur during, say, the vertical blanking period in the operation of the pickup tube which is 8 percent at a maximum of the time for a single field. Eight percent of the field period of $\frac{1}{60}$ second is $\frac{1}{480}$ second or $\frac{1}{480}\times 4{,}320=9°$ sector dimension. There are, then, on periods of 9° and off periods of $72-9=63°$. Hence, to provide the chart, we divide the angular dimension into five sectors each of 72°, and then divide each of these sectors into two parts, one of 9° and the other of 63°. The 9° sector provides the activated period of the light 74 and the 63° period the dark period. The 9° sector is provided with a reflector that periodically directs light emanating from source 70 to photo tube 71 which activates light tube 74. It is, of course, understood that the camera is operated in synchronism with television tube in the manner well known to the art, as by a synchronous motor 82 operating from the same 60 cycle alternating power line as supplies the television receiver tube 75. Other rates of operation of the film and tube can be accommodated by due consideration of the timing of elements and charts as here illustrated.

In using the camera as a projector with flash tube 74 providing the illumination, and using 6 film frames per second and 72 tube flashes per second, chart of Fig. 26 is used. This chart has three 120° sectors each divided into 24 areas. Areas 282 are non-reflecting and areas 283 are reflecting, and they control the tube 74 as previously described.

With the pull-down operating at the rate of 6 frames per second, and with light flashes for either the projector, the camera or the television tube occurring at 72 per second, it is necessary for some means to accelerate the pull-down beyond the rotary angular rate of the uniform power drive. To this end a modification of the pull-down of U. S. Patent 2,144,277 is utilized as shown in Figs. 36 to 41, inclusive of Patent 2,661,652.

Referring to Fig. 28, drive shaft 83 is shown terminating in abutment to the end of the motor shaft 340. A sliding tubular coupling 341 joins the two shafts. It carries at one end keys 342 which slide in straight longitudinal grooves 343 on motor shaft 340 and at the opposite end it carries key 344 which slides in helical groove 346 in the drive shaft 83. Both shafts have bearings in case 7. Between shoulders 347 and 348 on the coupling 341 a fork 349 engages the coupling and extends with stem 350 to a combination movable parallel to the aligned motor and drive shafts. The combination consists of a threaded rod 351 threaded into stem 350 and beyond to couple to a stem 352. Rotatably mounted in the wall in case 7 and retained by lock nuts 353 bushing 354 carries an internal thread through which extends threaded rod 351. Member 352 in alignment with rod 351 has a bearing in frame of case 7. Rotation of nut 354 moves the fork 349 and thus shifts the coupling axially along the two shafts 340 and 83 phasing the pull-down mechanism relative to the motor. Transparent thimble 354′ internally threaded acts as a lock nut on rod 351 by pressure against bushing 354 and gives by the position of the end of rod 351 an index of the phasing position. The phasing of the pull down mechanism relative to the motor is extended through extension 83′ of shaft 83 to the shutter 77 and therefrom by light 70 and photo tube 71 and associated tube agencies to picture tube 75. It is obvious that a series of developed film exposures at different phase settings by nut 354 will indicate the proper setting of the latter. Further phasing of the blanking agencies by manual lever 190 may be serially recorded and suitable setting retained.

Referring to Figs. 29 to 34 inclusive, the pull-down mechanism 84 is further developed to provide three color analyzing screens and actuating means therefor.

On the space plate 294 is mounted an assembly plate 355 by screws 356. On the plate is a stud 357 on which turns an internal gear 358 retained by snap ring 359′. Shaft 203 carries pinion 360 keyed thereto and retained by nut 304. The gear 358 encloses the pinion and nut and carries on its outer circumference a three place cam with segments 361, 362, 363, each a 120° arc and having faces radially separated a distance in accord with the movement they impart to a shoe 364 which is held against them by a spring 365. The ratio between gear 358 and pinion 360 is 3 to 1 so that cams move the shoe 364 once for each revolution of pinion 360. Shoe 364 is removably attached to the lower arm 366 of a bell crank of which the upper arm is 367. The bell crank is pivoted on pin 368 on plate 355. A stop pin 369 is provided to limit the travel of arm 366 under pressure of springs 365. Arm 366 is provided with holes for various positions of pin 368 to vary the relative length of arms 366 and 367. The free end of arm 367 fits in a fork 370 on the free end of a lever 371 pivoted at 372 in a recess 373 in plate 291. The recess 373 is covered by branch 288 of member 285. The recess 373 extends upwardly to house color analyzing frame 374 and then expands laterally to provide space for a spring therein, with ends 375 and 376 pressing downward against frame 374. The downward pressure of spring 376—375 on frame 374 is transmitted to lever 371 at contact point 377, through fork 370 to bell crank 367—366 to shoe 364 and thereby to cams 361, 362 and 363 as they rotate, so there is no lost motion in the transmission. This is essential since in some cases the movement of frame 374 by the cams is microscopic.

The frame 374 covers the exposure aperture outlined in dotted lines at 378 in Fig. 30. The frame is held in place by a frame 379 shown in cross section in Fig. 38 of Patent 2,661,652. The frame has top tongue 380 and bottom tongue 381 fitting into suitable retaining grooves. The top tongue and its groove are relatively deep. A space in supporting member 288 above the frame top is provided to accommodate upward movement of the frame 379 so that lower tongue 381 may be removed from its recess and the retainer removed for insertion of frame 374 in its adjacent position. The frame 374 is provided with a plurality of cross strips of transparent material which act as color filters, arranged in successive groups of red, blue, green, red, blue, green. In response to the action of cams 361, 362, 363, the frame 374 is shifted by the intervening linkage so that the exposure aperture area is fully covered once by each color for each revolution of cam wheel 358. The frame 374 provides filter strips 382 to keep the exposure aperture covered during all frame movement up and down. At the bottom of the frame are three characters 383, 384, 385, identifying the color filters blue, red, green, respectively, when rotating filters on the shutter structure are used. These characters cast their outline upon the part of the film outside the area subsequently projected on the viewing screen, in the manner set forth page 229, Rose's Cinematographer Handbook of 1946. In the present instance of reciprocation of frame 374, the characters represent positions one, two or three of the screen. In both cases the characters indicate the proper position of the color screens relative to the black and white film with which they are used for subsequent projection.

An alternate filter arrangement is shown in Fig. 33 where frame 374′ is shown with lugs 386 to limit the down travel under spring 375. Sliding member 387 extends through frame 374′ to engage spring 376 at the upper end and lever 371 at its lower end. Upward travel of member 387 is limited by its lower end structure. Mid-length of the member 387 is a short projection 388 with an angular face adapted by its movement upward to force sidewise a contacting face on frame 389. Frame 389 is held against projection 388 by a spring 390 in frame 374′. Frame 389 is supported at its bottom end by member 391 which limits frame movement due to spring 390 to a horizontal direction. The frame 389 is provided with color filters 392 arranged in horizontal strips of green between which are strips made up of squares of the width of the green strip. The squares are alternately red and blue. The screen 392 is shown in the middle position of three which it occupies under management of springs 375, 376, and lever 371. Further upward movement carries all the structure within frame 374′ which shifts the green strip to a position over the one previously occupied by the red and blue blocks. Further downward movement from the position indicated in Fig. 33, lowers projection 388 which allows the frame 389 to be moved to the left by spring 390, and thus the change in relative positions of the red and blue blocks. Access to chamber 77 is through door 393 hinged at 394. On the inner side of door 393 is mounted a stud 395 on which rocks lever 396 which has at its free end an inward projecting pin 397. The other end of lever 396 has a longitudinal slot in which operates pin 398 which extends from the outside through a longitudinal light sealed slot in the door 393. The pin 398 extends at right angles to the door 393 to an arm 399 on the armature 400 of solenoid 401 mounted on the door 393. Energizing of solenoid causes the armature to operate the lever 396 and swing pin 397 back and forth. When the door 393 is swung about hinge 394 to a closed position the lever 396 swings to the dotted outline position of Fig. 29, and pin 397 fits between shoe 364 and extension 402 of arm 366. Swinging of lever 396 by pressure of shoe 369 moves the armature 400 and the effect of this on the coil 401 may be used to indicate screen movement electrically. Coil 401 may be activated by connection to a television receiver circuit to synchronize screen movement with the television color analyzer.

Where three exposures are desired upon a single photographic frame, the gears 358 and 360 are removed and the cam 402, shown in Fig. 32, is substituted on shaft 203. Such removal is readily effected by removing snap ring 359′ and nut 304. Cam 402 has large sector 403 and small equal sectors 404 and 405. The large sector 403 is larger than the other two by an amount represented by the indicated acute angle indicated by the arrows. This arrangement provides equal exposure periods for each position of the blanking screen. The relative angular size of the cams determines the relative exposures. The relative radial sizes determine the travel of the blanking screen. In some cases the travel is microscopic. The lower limit is in the neighborhood of 0.002 inch as established in Dufay color elements although this is subject to change in accordance with screen practice. On the door 393 is also exteriorly mounted focusing device 406 made available to the lens 6 by side shifting handle 39 previously described.

Referring to Fig. 35, showing a vertical section through a film 455 and a blanking screen 456, the strip openings 457 are in width one-half the closed spaces 458 and are in length the width of the film. The blanking screen 456 may replace color screens 382 in frame 374 of Fig. 30. In such position the screen is shifted to three positions per photographic frame by the cam of Fig. 32, when suitably positioned on shaft 203. With such a positioning, red, blue and green filters are positioned on shutter disk 168 which rotates once before the screen 456 while the screen occupies the three positions before the film 455. The color filters are so positioned that the shift from one color to another occurs as the screen 456 shifts from position to position. By this arrangement the light through the colored filters affects the film in red, blue and green sequence over the whole film frame, and provides a three color analysis of the exposure light on a single frame. After development and conversion to a positive, the film may be projected through screen 382 in frame 374 with the frame being immobilized by removal of operating shoe 364.

The term light used in this application is intended to include those electromagnetic waves which are visible and invisible, capable of affecting a photographic emulsion, and some of being absorbed by a moving shutter.

The various mechanical arrangements presented and their description are by way of illustration only and it will be understood that other mechanical arrangements and devices may be employed to effect the modes of operation and the results described. Other arrangements, modifications and variations will occur to those skilled in the art to which the invention is related. Accordingly, my invention should be understood as not restricted to the specific embodiments illustrated and described but as including all embodiments coming within the scope of the following claims.

I claim:

1. In combination, a cathode ray tube of a television receiver providing successive images to be photographed, a motion picture camera to photograph said images and having an adjustable shutter and an intermittent film pull down mechanism to blank said tube; an operating connection between said blanking means and said camera synchronizing the blanking of said tube with the operation of said pull down mechanism, and means for holding the normal light obstructing portion of said shutter from cutting across the light path from said tube to said film while said images are being recorded.

2. In combination, a cathode ray tube of a television receiver providing images, a motion picture camera to photograph said images, a source of electric power, synchronizing means connected to said source of power to operate said tube and camera in synchronism, blanking means for preventing operation of said tube, intermittent pull down mechanism an adjustable shutter, an operating connection between said blanking means and said camera synchronizing the blanking of said tube with the operation of said pull down mechanism and means for holding the normal light obstructing portion of said camera shutter from cutting of any of the light passing from said tube to said film while said images are being recorded.

3. In combination for operation from a common source of 60-cycle alternating current, a cathode ray tube of a television receiver providing images at a first rate; a motion picture camera for taking pictures of said images at a second lesser rate, and including film pull down means, a rotary adjustable shutter comprising a plurality of circumferentially disposed overlapping sectors rotatable about a common center and mounted on a rotatable guide; said sectors being adapted to successive temporary displacement inwardly toward said guide, means for holding said sectors in said inwardly displaced position to prevent them from cutting off any of the light passing from said tube to said film while said images are being recorded, means to blank said tube, and an operating connection between said blanking means and said camera synchronizing the blanking of said tube with the operation of said pull down mechanism.

4. In combination for operation from a common source of 60-cycle alternating current, a cathode ray tube of a television receiver providing images at a first rate, a motion picture camera including a synchronous motor for taking pictures of said images at a second lesser rate including a rotary shutter comprising a plurality of circumferentially disposed sectors adapted to temporary displacement inwardly, means for displacing said sectors inwardly in succession to prevent them from cutting off any of the light passing from said tube to said film while said images are being recorded, an intermittent pull down mechanism, means to blank said tube; an operating connection between said camera and said blanking means synchronizing the blanking of said tube with the operation of said pull down mechanism, and means for synchronizing the operation of said tube and said camera.

5. In apparatus for recording on film television pictures which are reproduced on a cathode ray tube in conventional interlaced manner, a synchronous motor for operating said recording apparatus, a common source of 60 cycle alternating current for said tube and said motor whereby they are operated in fixed relationship; means for moving said film periodically before said tube, a shutter between said tube and said film operatively connected to said motor, said shutter carrying switching means, means for preventing reproduction of said pictures, an operating connection between said switching means and said preventing means providing said preventing interval of a duration suited to allow operation of said film moving means, means for synchronizing operation of said tube and said camera, and means for operating said shutter continuously open.

6. In apparatus for recording on film television pictures which are reproduced on a cathode ray tube in conventional interlaced manner, a synchronous motor for operating said apparatus, a common source of 60 cycle alternating current for said tube and said motor whereby they are operated synchronously; means for moving said film periodically before said tube; a shutter between said tube and said film said shutter carrying switching means, means for preventing reproduction of said pictures, an operating connection between said switching means and said preventing means providing said preventing interval of a duration suited to allow operation of said film moving means, means for synchronizing operation of said tube and said camera, means for operating said shutter continuously open, and means manually operable for shifting said switching means while said shutter is rotating.

7. In apparatus for recording on film television pictures which are reproduced on a cathode ray tube in conventional interlaced manner, a synchronous motor for operating said apparatus, a common source of 60 cycle alternating current for said tube and said motor; means for moving said film periodicaly before said tube; a shutter between said tube and said film said shutter carrying switching means, means for preventing reproduction of said pictures, an operating connection between said switching means and said preventing means providing said preventing interval of a duration suited to allow operation of said film moving means, means for synchronizing operation of said tube and said camera, means for operating said shutter continuously open, means manually operable for shifting said switching means while said shutter is rotating, and means for phasing the operation of said shutter and motor.

8. A combination of the character set forth in claim 1 wherein said normal light obstructing portion of the shutter is shifted progressively out of the light obstructing path and there held until past said path of light.

9. A combination of the character set forth in claim 1 wherein a three primary-color color screen is rotatably mounted to cut across the light traveling from said tube to said film, and means for driving said rotatably mounted member at one third of the rotating speed of said shutter whereby the said light is scanned serially by the successive colors of said screen, so that each image recorded on the film provides a color separation negative of said color series when developed, said screen shifting from one color to the other during movement of the film.

10. A combination of the character set forth in claim 1 wherein a multiple color screen is mounted to cut across the light traveling from said tube to said film, and means for shifting said screen in stages across said light to scan said image, said stages providing each successive image with its individual color separation record in a stage series, said shifting means operating during operation of said pull down mechanism.

11. A combination of the character set forth in claim 1 wherein a color screen is mounted to cut across the light traveling from said tube to said film, and means for suitably shifting said screen in stages across said light for scanning same, said color screen having stripes of equal width of red, blue and green filters arranged in series repeated across the direction of said movement, each shift extending approximately the width of a stripe, each stage of movement occurring during operation of said pull down mechanism.

12. In the process of recording televised pictures reproduced on a cathode ray tube as light images, the steps of progressively preventing obstruction to passage of the light of said images to the recording film during an exposure interval, preventing light images to form during a film moving interval, moving the film during said last mentioned prevention interval, allowing the images to form again and the light thereof to pass to the film, the appearance rate of said images being at a certain frame rate, the film moving operation being at a lesser frame rate, and arranging the sequences of said operations so that a full image is allowed to form and the light therefrom to pass to the film, a fraction of an image is prevented from forming and during said interval the film is pulled down, the remainder of said image is allowed to form and the light thereof to pass to the film, a full frame is allowed to form and the light thereof to pass to the film and a fractional part equalling the foregoing fractional part of a full frame is allowed to form and the light thereof to pass to said film.

References Cited in the file of this patent

UNITED STATES PATENTS

| | | |
|---|---|---|
| 1,558,483 | Kelly | Oct. 27, 1925 |
| 1,784,515 | Fairall | Dec. 9, 1930 |
| 2,082,093 | Bedford | June 1, 1937 |
| 2,136,209 | Finch | Nov. 8, 1938 |
| 2,251,786 | Epstein | Aug. 5, 1941 |
| 2,270,198 | Schensted | Jan. 13, 1942 |
| 2,312,308 | Boecking | Mar. 2, 1943 |
| 2,414,319 | Milholland | Jan. 14, 1947 |
| 2,415,390 | Konkle | Feb. 4, 1947 |
| 2,565,366 | Gray | Aug. 21, 1951 |
| 2,595,397 | Lee et al. | May 6, 1952 |
| 2,604,535 | Garman et al. | July 22, 1952 |
| 2,613,264 | Haynes | Oct. 7, 1952 |
| 2,664,465 | Gillette | Dec. 29, 1953 |